United States Patent

Salas

[19]

[11] Patent Number: 5,924,018
[45] Date of Patent: Jul. 13, 1999

[54] ANALOG MICROWAVE COMMUNICATION SYSTEM HAVING A MICROWAVE HOP CONVERTED TO A NEW OPERATING FREQUENCY AND METHOD

[75] Inventor: Martin Philip Salas, Richardson, Tex.

[73] Assignee: Alcatel Network Systems, Inc., Richardson, Tex.

[21] Appl. No.: 08/846,624

[22] Filed: Apr. 30, 1997

[51] Int. Cl.[6] ............................................... H04B 1/40
[52] U.S. Cl. ........................... 455/74; 455/118; 455/131; 455/323
[58] Field of Search ................... 455/74, 20, 67.5, 455/73, 75, 86, 561, 118, 119, 130, 131, 189.1, 190.1, 313, 315, 318, 323, 337

[56] References Cited

U.S. PATENT DOCUMENTS 4,701,935  10/1987  Namiki ........................................ 455/21
5,781,847  7/1998  Clarke et al. ............................. 455/69

Primary Examiner—Curtis A. Kuntz
Assistant Examiner—Binh K. Tieu
Attorney, Agent, or Firm—Gray Cary Ware & Freidenrich, LLP

[57] ABSTRACT

A converted analog radio (71) is disclosed for converting an analog microwave hop (70) to a new operating frequency. The converted analog radio (71) comprises an analog radio (72) operable to communicate microwave signals at a first frequency, a digital radio (74) operable to communicate microwave signals at a second frequency, and a conversion assembly (76). Reception components (40, 42, 44) and transmission components (56, 58, 60, 62) of the digital radio (74) are used to communicate at the new operating frequency. Intermediate frequency components (26, 28, 30, 32) of the analog radio (72) are used to process intermediate frequency signals, and the conversion assembly (76) is used to convert from the prior operating frequency to an intermediate frequency for use by the transmission components (56, 58, 60, 62) of the digital radio (74).

20 Claims, 3 Drawing Sheets

ANALOG MICROWAVE COMMUNICATION SYSTEM HAVING A MICROWAVE HOP CONVERTED TO A NEW OPERATING FREQUENCY AND METHOD

TECHNICAL FIELD OF THE INVENTION

This invention relates in general to microwave communication systems, and more particularly to an analog microwave communication system having a microwave hop converted to a new operating frequency and method.

BACKGROUND OF THE INVENTION

Microwave communication systems are widely used to provide networks for supporting communications across geographic regions. Such microwave communication systems can carry analog and digital signals. Historically, analog microwave communication systems, operated at a frequency of two gigahertz (2 GHz), have been used by railroad companies, power companies, pipeline operators and state and local governments to support private networks for voice and data communication. Digital microwave communication systems also are used to support voice and data traffic and are being used, for example, to implement digital personal communication services (PCS).

In general, microwave communication systems can include a number of microwave links arranged in a series or loop. The geographic regions between adjacent links and across which adjacent links communicate are typically referred to as microwave hops. Each microwave link typically includes a pair of radios to allow bi-directional communication across the microwave hops. Each microwave link also typically includes signal processing equipment for processing dropped lines and preparing inserted lines and for providing communication to and from local end points.

Recently, frequencies in the 1850 to 1990 megahertz (MHz) range (i.e., 1.85 to 1.99 GHz) have been allocated to providers of digital personal communication services (PCS). Various PCS providers subsequently purchased rights to use these frequencies in certain geographic areas and have established communication networks to support digital PCS. Where these new networks overlap and interfere with microwave hops of existing 2 GHz analog microwave communication systems, the PCS providers are required to relocate the operating frequencies of the existing 2 GHz microwave hops.

In this relocation effort, PCS providers often buy out the 2 GHz analog microwave communication systems and replace them with 6 or 11 GHz digital microwave systems. However, the cost of converting an entire existing analog microwave system to a digital system can be prohibitive. The conversion is costly because, in addition to the cost of converting the microwave radios and transmission equipment (such as microwave towers and antennas), there is the additional cost of converting signal processing equipment used to drop and insert lines at each microwave link. Further, there is rarely sufficient time to change an entire analog 2 GHz system to a 6 or 11 GHz digital system before PCS is scheduled to be implemented. Consequently, it is desirable for PCS providers to convert the operating frequency of only the necessary microwave hops of an existing 2 GHz analog microwave system rather than replacing the entire system with a new digital microwave system. Such a partial conversion allows the PCS provider to more quickly and inexpensively begin providing PCS in a region.

One method for converting microwave communications out of the 2 GHz operating frequency involves replacing existing 2 GHz analog radios with equivalent 6 GHz analog radios for all of the affected microwave hops. However, 6 GHz analog radios are relatively difficult and expensive to obtain and are typically available only as used equipment. For this reason, PCS providers can not rely upon 6 GHz analog radios as a solution.

Another conventional method for converting microwave communications out of the 2 GHz operating frequency involves replacing analog microwave hops with digital microwave hops at a new frequency (e.g., 6 or 11 GHz). To accomplish this conversion, the PCS provider must install necessary equipment to convert the signal to or from the analog baseband where the communication returns to analog at the end points of the digital region. The PCS provider must also install such equipment in the digital region for enabling communication to local end points. For example, in order to convert a DS3 digital signal to an analog baseband signal, the PCS provider would need to install an M13 multiplexer and twenty eight digital channel banks. With this equipment, the DS3 digital signal is processed by the M13 multiplexer to recover twenty eight DS1 signals. Each of the twenty eight DS1 signals is then fed to one of the twenty eight digital channel banks which each recover twenty four voice channels. All of the voice channels are then fed into an analog channel bank which combines the voice channels into the analog baseband. Using the same equipment, the above process can be reversed in order to convert from the analog baseband signal to the digital signal. Because the PCS provider must install such signal processing equipment in addition to replacing the analog microwave hops with digital microwave hops at the new operating frequency, this conversion method is both costly and time consuming for the PCS providers.

SUMMARY OF THE INVENTION

In accordance with the present invention, an analog microwave communication system having a microwave hop converted to a new operating frequency and method of conversion are provided that provide advantages over prior methods for converting hops in analog microwave systems to new operating frequencies.

According to one aspect of the present invention, a converted analog radio is disclosed for converting an analog microwave hop to a new operating frequency. The converted analog radio comprises an analog radio operable to communicate microwave signals at a first frequency, a digital radio operable to communicate microwave signals at a second frequency, and a conversion assembly. Reception components and transmission components of the digital radio are used to communicate at the new operating frequency. Intermediate frequency components of the analog radio are used to process intermediate frequency signals, and the conversion assembly is used to convert from the prior operating frequency to an intermediate frequency for use by the transmission components of the digital radio.

A technical advantage of the present invention is the conversion of an analog microwave hop to a new operating frequency (e.g., from 2 GHz to 6 or 11 GHz) using portions of existing analog radios and portions of newly installed digital radios. Conversion to the new operating frequency is thereby accomplished at lower cost when compared to conventional conversion methods.

Another technical advantage of the present invention is the ability to convert an analog microwave hop to a new operating frequency more quickly and easily. The new configuration can be quickly connected and brought into function without the installation and testing time required by other conversion methods.

A further technical advantage of the present invention is that the converted analog microwave hop is prepared for eventual conversion to digital because a full digital radio is in place. When it is desired to convert to a digital system, the connections can easily be changed to place the remaining components of the digital radio in use and the prior analog radio can be removed.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
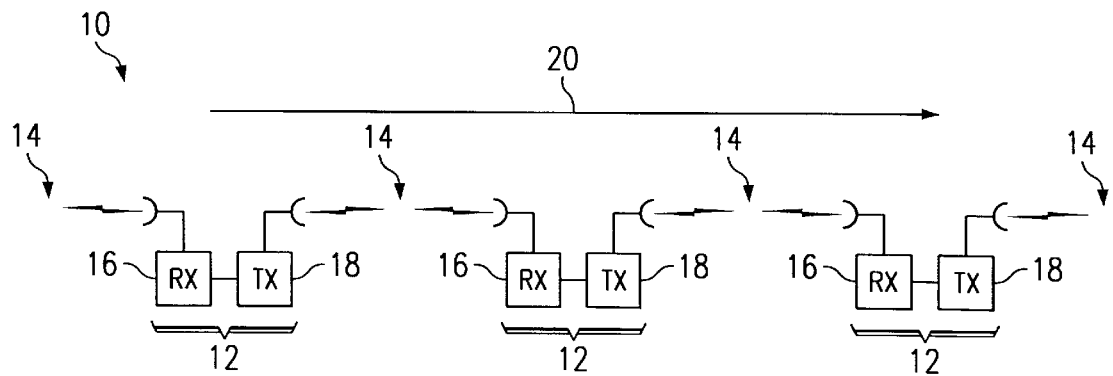
FIG. 1 is a block diagram of a microwave communication system having a number of microwave hops.

FIG. 1 is a block diagram of a portion of a microwave communication system, indicated generally at 10, having a number of microwave hops. Microwave communication system 10 can be implemented to support analog or digital signal communication. One conventional use of microwave communication system 10 is by railroad companies, power companies, pipeline operators, and state and local governments to support communication across large geographic areas at a reduced cost compared to leasing telephone lines.

As shown in FIG. 1, microwave communication system 10 can comprise a plurality of microwave links 12. Each microwave link 12 includes equipment for communicating microwave signals at a certain operating frequency across adjacent geographic regions, indicated generally at 14. These geographic regions 14 can be referred to as microwave hops. As shown in FIG. 1, each microwave link 12 can include a receive side 16 and a transmit side 18 and thereby provides communication across adjacent microwave hops 14 in the direction shown by arrow 20. To implement receive side 16 and transmit side 18, each microwave link 12 generally includes microwave radios operating at a designated frequency. Each microwave link 12 also includes appropriate microwave towers and antennas as well as generators and other equipment needed to transmit and receive microwave communications. Common operating frequencies for microwave hops 14 include 2 GHz, 6 GHz, and 11 GHz frequencies. However, other operating frequencies are used as well.

Although not shown in FIG. 1, a microwave communication system 10 often includes a second pair of receive and transmit sides in each microwave link 12. This second pair of equipment provides communication in the opposite direction to arrow 20. In this manner, each microwave link 12 is operable to communicate bi-directionally across adjacent microwave hops 14.

Figure 2:
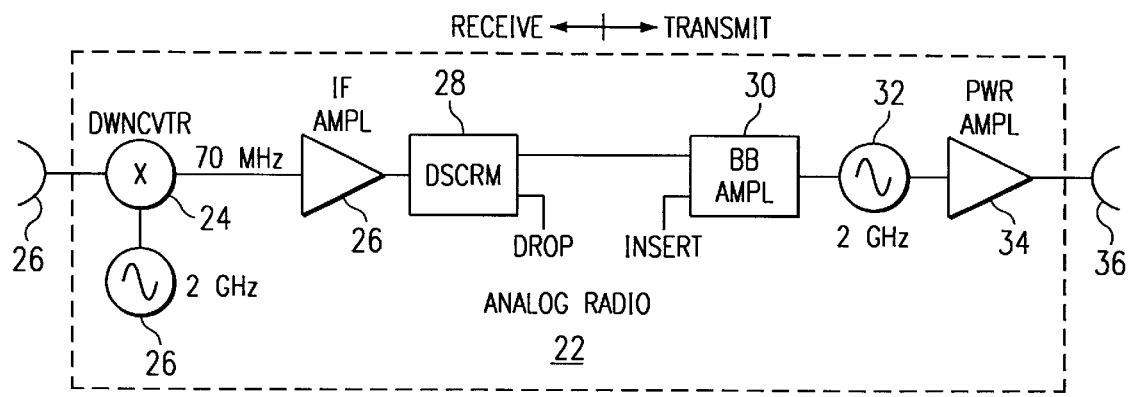
FIG. 2 is a block diagram of one embodiment of an analog radio used to communicate across adjacent analog microwave hops.

FIG. 2 is a block diagram of one embodiment of an analog radio 22 used to communicate across adjacent analog microwave hops. The components of analog radio 22 shown in FIG. 2 are typical elements for an analog microwave radio. On the receive side, analog radio 22 includes a down-converter 24 coupled to a microwave antenna 26 and a local microwave source 26. The output of down-converter 24 is coupled to the input of an intermediate frequency (IF) amplifier 26. The output of IF amplifier 26 is in turn coupled to a discriminator 28. Discriminator 28 provides discriminated signals to the transmit side as well as dropped lines for communication to local end points. On the transmit side, analog radio 22 includes a baseband amplifier 30 coupled to discriminator 28. Baseband amplifier 30 receives the discriminated signals from discriminator 28 in addition to receiving insert lines for communications originating from local end points. Baseband amplifier 30 has an output coupled to a local microwave source 32. The output of microwave source 32 is coupled to the input of a power amplifier 34. The output of power amplifier 34 is in turn coupled to a microwave antenna 36.

In operation, on the receive side, down-converter 24 receives an incoming microwave signal from microwave antenna 26. In the embodiment of FIG. 2, the incoming signal is a 2 GHz analog signal. Down-converter 24 also receives a signal from microwave source 26. In this embodiment, microwave source 26 provides a signal that is 70 megahertz (MHz) removed from the 2 GHz signal received on antenna 26. Down-converter 24 converts the incoming microwave signal to an intermediate frequency signal using the signal from microwave source 26. In the embodiment of FIG. 2, the intermediate frequency is 70 megahertz (MHz). The intermediate frequency signal is provided to IF amplifier 26 which filters the signal and applies amplification such that the signal level is compatible with discriminator 28. Discriminator 28 then provides signal detection to process the analog 70 MHz signal and recover the voice channels from the analog baseband. Designated voice channels can then be dropped from discriminator 28 for communication to local end points. Discriminator 28 also provides the discriminated voice channels to the transmit side of analog radio 22.

On the transmit side, baseband amplifier 30 amplifies baseband signal received from discriminator 28. Baseband amplifier 30 also receives insert lines for communications originating from local end points. The out put of baseband amplifier 30 is then applied to microwave source 32 to prepare the signal for transmission. Microwave source 32 modulates the baseband signal to an appropriate microwave frequency which is 2 GHz in the embodiment of FIG. 2. The output of microwave source 32 is then amplified by power amplifier 34 and transmitted from microwave antenna 36. In general, analog radio 22 services adjacent microwave hops by receiving microwave signals on antenna 26 and transmitting microwave signals on antenna 36.

Figure 3:
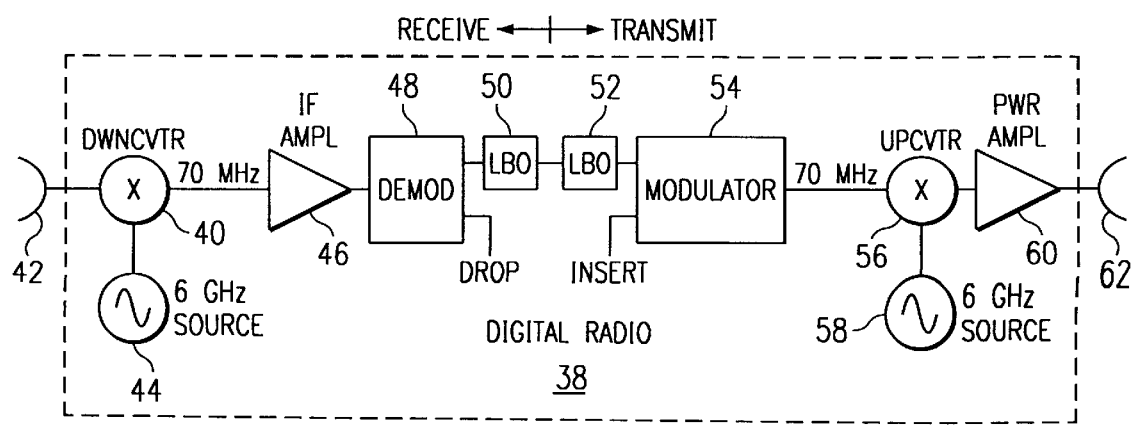
FIG. 3 is a block diagram of one embodiment of a digital radio used to communicate across adjacent digital microwave hops.

FIG. 3 is a block diagram of one embodiment of a digital radio 38 used to communicate across adjacent digital microwave hops. One example of a digital radio 38 is an MDR 4000 series digital radio available from ALCATEL NETWORK SYSTEMS. The components of digital radio 38 shown in FIG. 3 are typical elements for a digital microwave radio. On the receive side, digital radio 38 includes a down-converter 40 coupled to a microwave antenna 42 and a local microwave source 44. The output of down-converter 40 is coupled to the input of an intermediate frequency (IF) amplifier 46. The output of IF amplifier 46 is in turn coupled to a demodulator 48. Demodulator 48 provides demodulated signals to a line build out network 50 which in turn provides the signals to the transmit side of digital radio 38. Demodulator 48 also provides dropped lines for communication to local end points. On the transmit side, digital radio 38 includes a second line build out network 52 coupled to line build out network 50. A modulator 54 is coupled to and receives demodulated signals from line build out network 52 in addition to receiving insert lines for communications originating from local end points. Modulator 54 has an output coupled to an up-converter 56. Up-converter 56 is coupled to a local microwave source 58 and to a power amplifier 60. The output of power amplifier 60 is then coupled to a microwave antenna 62.

In operation, in the receive side, digital radio 38 operates in a manner analogous to that of analog radio 22. The incoming microwave signal is first translated to an intermediate frequency signal. In the embodiment of FIG. 2, the incoming signal is a 6 GHz digital signal, and the intermediate frequency is at 70 MHz. Similar to analog radio 22, down-converter 40 generates the 70 MHz intermediate frequency using the signal provided by microwave source 44, which is 70 MHz removed from the 6 GHz signal received on antenna 42. The intermediate frequency signal is then amplified by IF amplifier 46. The amplified signal is filtered and demodulated by demodulator 48 to detect the digital signal. Line build out networks 50 and 52 operate to equalize signal levels to maintain proper levels within the digital signals.

On the transmit side, the digital signal is modulated at an intermediate frequency by modulator 54. In the embodiment of FIG. 3, this intermediate frequency is 70 MHz. The intermediate frequency signal is then up-converted, or mixed, by up-converter 56 to produce the microwave frequency outgoing signal. Up-converter 56 uses microwave source 58 to produce the outgoing signal, which is a 6 GHz signal in the embodiment of FIG. 3. The microwave signal is then amplified by power amplifier 60 and transmitted using microwave antenna 62.

In addition to having a digital radio 38 or analog radio 22, a microwave link includes the communication equipment necessary to handle the dropped and inserted lines. A microwave link having an analog radio typically requires an analog channel bank to process dropped and inserted analog voice channels. On the other hand, a microwave link having a digital radio typically uses an M13 multiplexer and digital channel banks to convert between DS3 and DS1 digital signals and analog voice channels. Thus, installed microwave links of an analog microwave communication system typically include communication equipment that is not compatible with signals carried by digital radios. Consequently, conversion of a microwave hop from analog to digital generally requires conversion of the digital signal to analog signals in order to utilize existing analog communication equipment.

Figure 4:
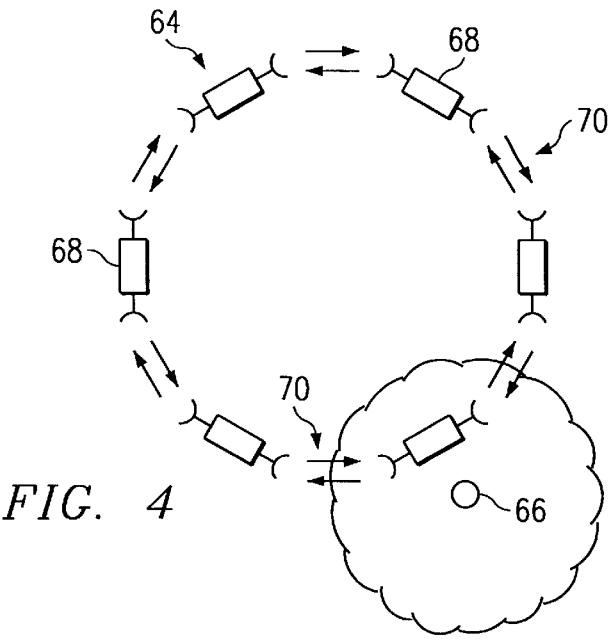
FIG. 4 is a block diagram of one embodiment of an analog microwave communication system having microwave hops interfered with by a PCS provider.

FIG. 4 is a block diagram of one embodiment of an analog microwave communication system, indicated generally at 64, having microwave hops interfered with by a PCS provider. As shown, analog microwave communication system 64 would be affected by interference from by a microwave cell, indicated generally at 66, that is to be installed by a PCS provider. In this example, microwave communication system 64 operates at a frequency of 2 GHz, and microwave cell 66 would generate interference because it also will be implemented in the 2 GHz range.

As shown, analog microwave communication system 64 comprises a plurality of microwave links 68 arranged in a ring structure. In this embodiment, each microwave link 68 comprises dual analog microwave radios to provide communication in both directions around the ring structure. Microwave links 68 communicate across microwave hops 70 using 2 GHz analog microwave radios. PCS microwave cell 66 also is intended to use signals in the 2 GHz range. Consequently, if installed without any conversion to microwave communication system 64, PCS microwave cell 66 would produce interference with two of the microwave hops 70. It is the obligation of the PCS provider to resolve this problem such that microwave communication system 64 can be operated without interruption.

One method for resolving this problem is to convert the affected microwave hops 70 to a new operating frequency such that microwave cell 66 will not interfere. According to the teachings of the present invention, a PCS provider can make such a conversion by converting the analog radios at affected microwave links 68 to a new operating frequency using a digital radio designed to operate at the new frequency and an appropriate conversion assembly. It should be understood that, depending upon the region of interference, different portions of affected microwave links 68 will need to be converted. For example, referring to FIG. 4, one of the microwave links 68 needs to have both analog radios converted because both microwave hops 70 serviced by that microwave link 68 are affected. However, two of the affected microwave links 68 only require one side of their analog radios to be converted because only the microwave hop 70 on that side is affected.

Figure 5:
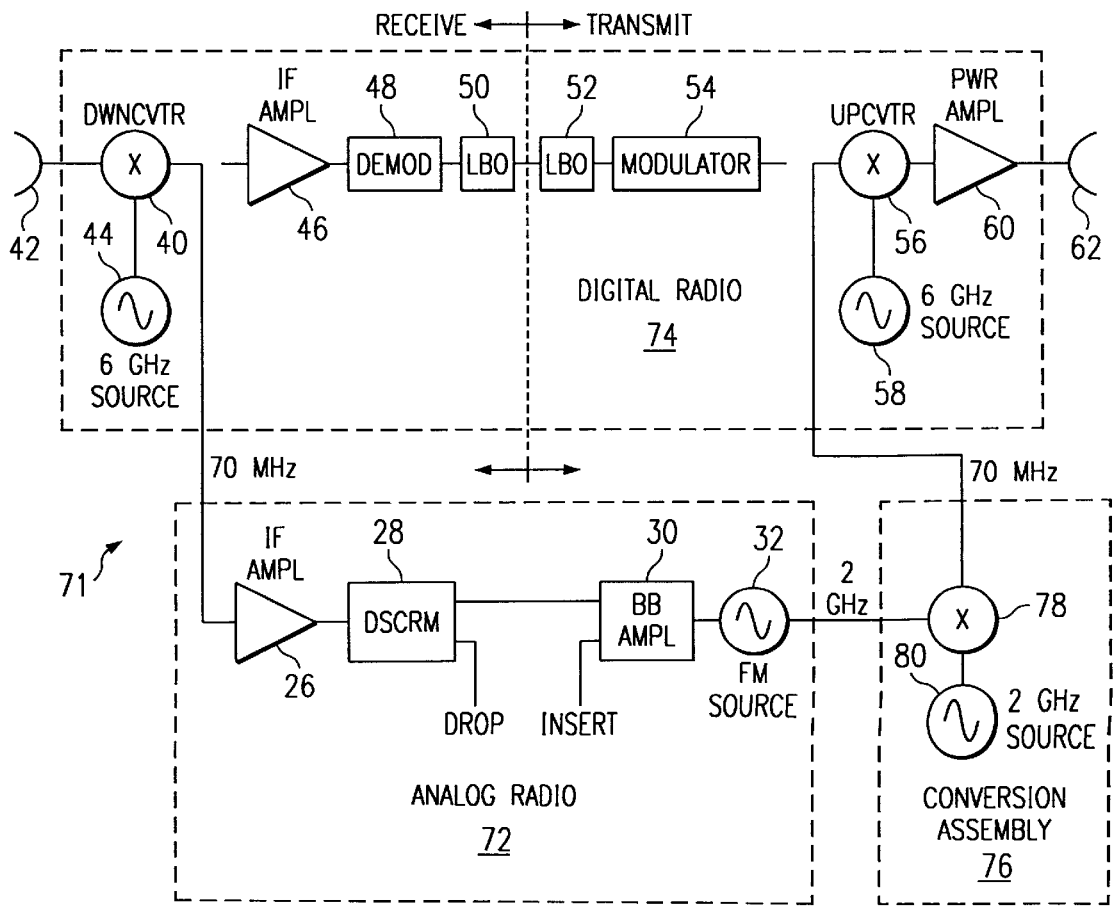
FIG. 5 is a block diagram of one embodiment of a converted analog radio for operating an analog microwave hop at a new frequency according to the teachings of the present invention.

FIG. 5 is a block diagram of one embodiment of a converted analog radio, indicated generally at 71, for operating an analog microwave hop at a new frequency according to the teachings of the present invention. As shown, converted analog radio 71 includes three major components: a previously installed analog radio 72, a newly installed digital radio 74 and a conversion assembly 76. In the embodiment of FIG. 5, previously installed analog radio 72 was operated at a frequency of 2 GHz, newly installed digital radio 74 is designed to operate at 6 GHz, and the new operating frequency provided by converted analog radio 71 is 6 GHz.

As shown in FIG. 5, analog radio 72 can include the same components as described with respect to FIG. 2 (note that not all components are shown in FIG. 5). Similarly, digital radio 74 can include the same components as described with respect to FIG. 3. Conversion assembly 76 can include a down-converter 78 connected to a microwave source 80 which provides a signal that is 70 MHz removed from the 2 GHz signal generated by analog radio 72.

According to the teachings of the present invention, converted analog radio 71 is constructed using components of analog radio 72, components of digital radio 74, and conversion assembly 76. On the receive side, down-converter 40 is coupled to microwave antenna 42 and microwave source 44. The output of down-converter 40 is coupled to the input of the IF amplifier 26 of analog radio 72, and the output of IF amplifier 26 is coupled to discriminator 28. On the transmit side, the output of broadband amplifier 30 is coupled to a microwave source 32, and the outgoing microwave signal is in turn coupled to down-converter 78 of conversion assembly 76. The output of down-converter 78 is then coupled to the input of up-converter 56 of digital radio 74. Up-converter 56 is coupled to microwave source 58 and to power amplifier 60 which provides an amplified signal to microwave antenna 62 for transmission.

In operation, microwave antenna 42, down-converter 40 and microwave source 44 of digital radio 74 receive a signal at the new operating frequency. These components operate in the same manner as described above with respect to the digital radio of FIG. 3. The output of down converter 40, which is a 70 MHz analog signal, is provided to the input of the IF amplifier 26 of the existing analog radio 72. IF amplifier 26 and discriminator 28 of analog 28 then operate in the same manner as described above with respect to the analog radio of FIG. 2. On the transmit side, the baseband amplifier 30 and microwave source 32 of existing analog radio 72 are used in the same manner as described above. The output of microwave source 32 is then provided to down-converter 78 of conversion assembly 76. Down-converter 78 uses microwave source 80 to convert the 2 GHz analog signal to a 70 MHz intermediate frequency analog signal. In this manner, conversion assembly 76 operates to receive the signal that formerly was applied to power amplifier 34 of analog radio 72 (not shown in FIG. 5) and convert that signal to a 70 MHz signal. The 70 MHz intermediate frequency signal is then provided to up-converter 56 in digital radio 74. Up-converter 56, microwave source 58, power amplifier 60 and microwave antenna 62 operate as described above with respect to the digital radio of FIG. 3. These components convert the 70 MHz signal to an outgoing signal at the new operating frequency of 6 GHz.

According to the teachings of the present invention, a microwave hop can be converted to a new operating frequency using a new digital radio and a conversion assembly as shown in FIG. 5. The receive side, the transmit side or both sides can be converted as necessary. To convert the receive side, the down-converter 40 of digital radio 74 is connected to the IF amplifier 26 of analog radio 72 rather than being connected to the IF amplifier 46 of digital radio 74. In this manner, the microwave hop on the receive side is converted from the prior operating frequency of 2 GHz to the new operating frequency of 6 GHz. To convert the transmit side, the output of microwave source 32 of analog radio 72 is connected to conversion assembly 76 rather than being connected to power amplifier 34 of analog radio 72, and conversion assembly 76 is then connected to up-converter 56 of digital radio 74. In this manner, the microwave hop on the transmit side is converted from the prior operating frequency of 2 GHz to the new operating frequency of 6 GHz.

As should be understood, the cost of equipment for converting an analog microwave hop to a new operating frequency is the cost of a new digital radio 74 at the new operating frequency and the cost of an appropriate conversion assembly 76 for each microwave link that services the microwave hop. The installation of this equipment is then relatively straight forward and can be accomplished in a relatively short period of time.

Figure 6:
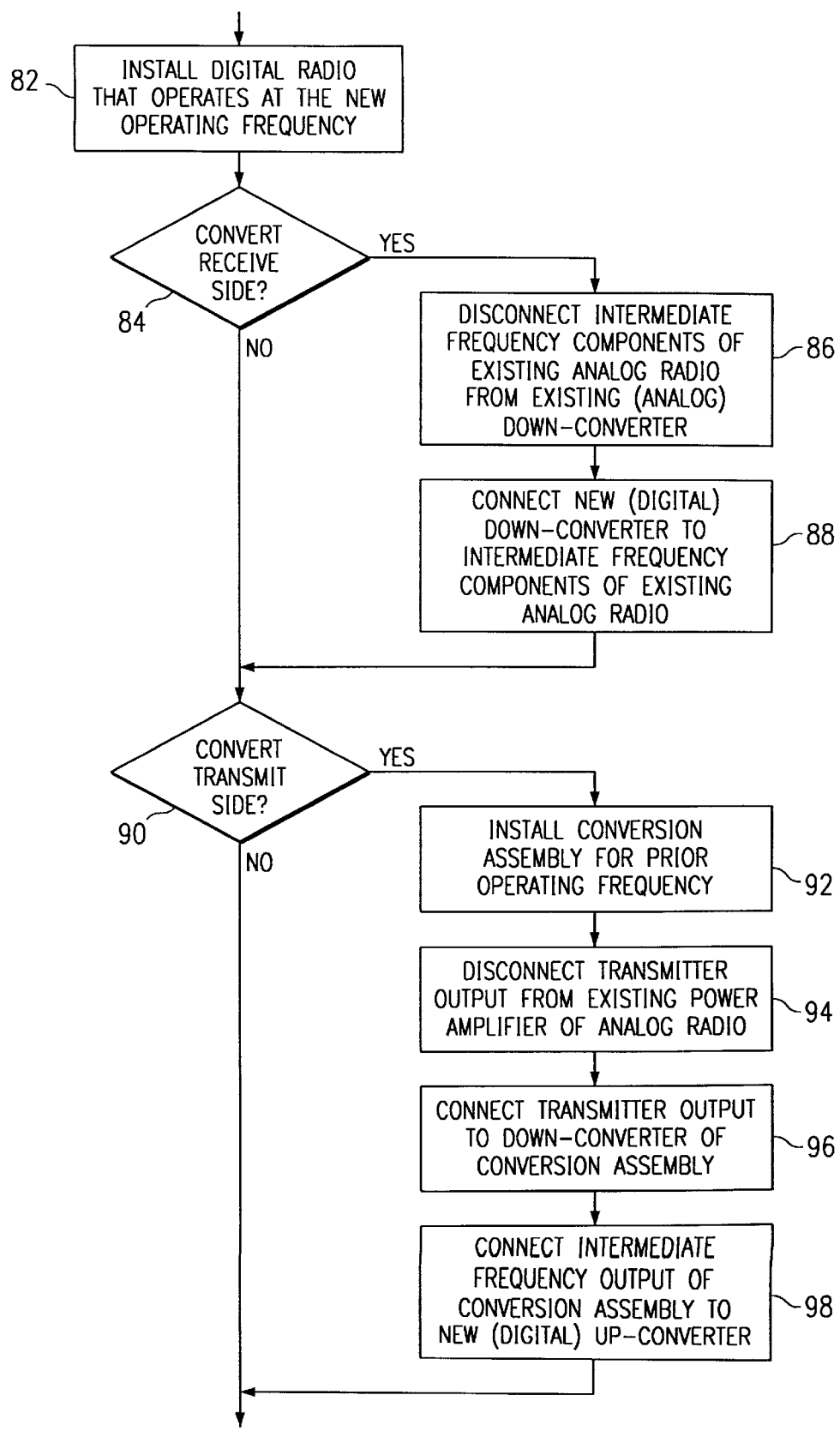
FIG. 6 is a flow chart of a method for converting analog microwave hops to a new operating frequency according to the teachings of the present invention.

FIG. 6 is a flow chart of a method for converting analog microwave hops to a new operating frequency according to the teachings of the present invention. The method of FIG. 6 is performed at each microwave link that services a microwave hop being converted. In step 82, a digital radio is installed that operates at the new operating frequency. Step 82 can include installing a new microwave tower and microwave antennas as needed for higher frequency communications. Further, installation can include installing additional power sources and other equipment needed to operate at a higher frequency. Although the present invention has been described above with respect to a conversion from 2 GHz operation to 6 GHz operation, the conversion can also be from 2 GHz operation to 11 GHz operation or between any other two operating frequencies. In the case of converting from a higher frequency to a lower frequency, changes to the microwave towers, antennas or power sources may not be necessary.

In step 84 it is determined whether the microwave hop on the receive side of the microwave link needs to be converted. If so, in step 86, the intermediate frequency components of the existing analog radio are disconnected from the output of the existing analog radio down-converter. Then, in step 88, the output of the new digital radio down-converter is connected to the intermediate frequency components of the existing analog radio. This connection completes the conversion of the receive side of the microwave link to the new operating frequency.

In step 90, it is determined whether the microwave hop on the transmit side of the microwave link needs to be converted. If so, in step 92, a conversion assembly appropriate for the prior operating frequency is installed. As shown in the example of FIG. 5, the conversion assembly is designed to convert from the prior operating frequency to an intermediate frequency signal. In step 94, the transmitter output of the microwave source of the existing analog radio is disconnected form the power amplifier. In step 96, the transmitter output is then connected to the down-converter of the conversion assembly. In step 98, the intermediate frequency output of the conversion assembly is connected to the new up-converter of the digital radio. This connection completes the conversion of the transmit side of the microwave link to the new operating frequency.

In summary, according to the teachings of the present invention, existing intermediate frequency processing portions of an analog radio can be utilized in conjunction with components of a new digital radio in order to convert the analog radio to a new operating frequency. The method of the present invention is advantageous for a number of reasons. Among those reasons are that digital radios operating at desired frequencies are relatively easy to obtain and are expensive to install than other conversion alternatives. For example, where the analog radio currently operates at 2 GHz, it can be very beneficial to use a new 6 GHz digital radio to accomplish the conversion. The new 6 GHz digital radio provides reception and transmission of 6 GHz microwave signals which can then be fed to the intermediate frequency processing portions of the analog radio to accomplish processing functions in the current manner. With the use of an appropriate conversion assembly the modulated broadband output of the existing analog radio can be converted to an intermediate frequency appropriate for up-conversion by the digital radio components for transmission at the new frequency.

Further, once installed, the digital radio is in place such that if the system operator desires to convert to a digital system, the digital radio can be reconnected in its original intended manner. The prior analog radio can then be removed along with the conversion assembly. Thus, not only is the conversion method of the present invention less expensive and more easily implemented but it also provides a head start on an eventual conversion to a digital microwave communication system at the new operating frequency.

Although the present invention has been described in detail, it should be understood that various substitutions, changes and alterations can be made hereto without departing from the spirit and scope of the invention as defined by the appended claims.

What is claimed is:

1. A converted analog radio for operating an analog microwave hop at a new frequency, comprising:
    an analog radio operable to communicate microwave signals at a first frequency, the analog radio comprising:
        an intermediate frequency amplifier having an input and an output, and
        a discriminator coupled to the output of the intermediate frequency amplifier; and
    a digital radio operable to communicate microwave signals at a second frequency, the digital radio comprising:
        a microwave source for providing a microwave signal offset from the second frequency by an intermediate frequency, and
        a down-converter coupled to receive a microwave signal from a microwave antenna and to receive the microwave signal from the microwave source, the down-converter operable to generate an intermediate frequency signal therefrom, and the down-converter coupled to provide the intermediate frequency signal to the input of the intermediate frequency amplifier;
    such that the converted analog radio has a receive side converted to receive signals across a microwave hop at the second frequency.

2. The converted analog radio of claim 1, wherein the analog radio is an existing component of an analog microwave communication system operating at the first frequency prior to conversion.

3. The converted analog radio of claim 2, wherein the digital radio is a newly installed component used to convert an analog microwave hop of the analog microwave communication system to the second frequency.

4. The converted analog radio of claim 2, wherein the first frequency is two gigahertz.

5. The converted analog radio of claim 3, wherein the first frequency is two gigahertz, and the second frequency is six gigahertz.

6. The converted analog radio of claim 3, wherein the first frequency is two gigahertz, and the second frequency is eleven gigahertz.

7. A converted analog radio for operating an analog microwave hop at a new frequency, comprising:
    an analog radio operable to communicate microwave signals at a first frequency, the analog radio comprising:
        a baseband amplifier for providing an amplified analog baseband signal, and
        a first microwave source coupled to receive the amplified analog baseband signal and operable to generate a microwave signal at the first frequency therefrom;
    a conversion assembly comprising:
        a second microwave source for providing a microwave signal offset from the first frequency by an intermediate frequency, and
        a down-converter coupled to receive the microwave signal from the first microwave source and the microwave signal from the second microwave source, the down-converter operable to generate an intermediate frequency signal therefrom; and
    a digital radio operable to communicate microwave signals at a second frequency, the digital radio comprising:
        a third microwave source for providing a microwave signal offset from the second frequency by an intermediate frequency,
        a power amplifier having an input and an output, the output operable to provide an amplified signal to a microwave antenna, and
        an up-converter coupled to receive the intermediate frequency signal from the down-converter and the microwave signal from the third microwave source, the up-converter operable to generate a microwave signal at the second frequency therefrom, and the up-converter coupled to provide the generated microwave signal to the input of the power amplifier;
    such that the converted analog radio has a transmit side conveted to transmit signals across a microwave hop at the second frequency.

8. The converted analog radio of claim 7, wherein the analog radio is an existing component of an analog microwave communication system operating at the first frequency prior to conversion.

9. The converted analog radio of claim 8, wherein the digital radio and the conversion assembly are newly installed components used to convert an analog microwave hop of the analog microwave communication system to the second frequency.

10. The converted analog radio of claim 8, wherein the first frequency is two gigahertz.

11. The converted analog radio of claim 9, wherein the first frequency is two gigahertz, and the second frequency is six gigahertz.

12. The converted analog radio of claim 9, wherein the first frequency is two gigahertz, and the second frequency is eleven gigahertz.

13. An analog microwave communication system having a microwave hop converted to a new operating frequency, comprising:
    a first analog microwave link having a converted analog radio,
        the converted analog radio operable to receive a microwave signal across a first microwave hop transmitted at a first frequency and operable to transmit a microwave signal across a second microwave hop at a second frequency,
        the converted analog radio comprising a conversion assembly coupled to receive a microwave signal at the first frequency from components of an analog radio and operable to generate a first intermediate frequency signal, and
        the converted analog radio further comprising components of a digital radio coupled to receive the first intermediate frequency signal and operable to convert the first intermediate frequency signal to the second frequency for transmission across the second microwave hop; and
    a second analog microwave link having a second converted analog radio,
        the second converted analog radio operable to receive the microwave signal transmitted across the second microwave hop at the second frequency,
        the second converted analog radio comprising components of a digital radio used to receive the microwave signal at the second frequency and operable to convert the microwave signal to a second intermediate frequency signal, and
        the second converted analog radio further comprising components of an analog radio coupled to receive and process the second intermediate frequency signal.

14. The analog microwave communication system of claim 13, wherein the first frequency is two gigahertz.

15. The analog microwave communication system of claim 14, wherein the second frequency is six gigahertz.

16. The analog microwave communication system of claim 14, wherein the second frequency is eleven gigahertz.

17. A method for converting an analog microwave hop to a new operating frequency, comprising:

installing a digital radio at a microwave link where the digital radio has a new operating frequency; and converting the receive side of the microwave link by:

disconnecting intermediate frequency components of an existing analog radio from an existing down-converter of the analog radio, and connecting a down-converter of the digital radio to the intermediate frequency components of the existing analog radio.

18. The method of claim 17, further comprising:

converting the transmit side of the microwave link by:

installing a conversion assembly appropriate for a prior operating frequency of the microwave hop, disconnecting a microwave signal output of the analog radio from an existing power amplifier in the analog radio, connecting the microwave signal output to the conversion assembly, and connecting an intermediate frequency output of the conversion assembly to an up-converter of the digital radio.

19. The method of claim 17, wherein the new operating frequency is six gigahertz.

20. The method of claim 18, wherein the new operating frequency is six gigahertz and the prior operating frequency is two gigahertz.

\* \* \* \* \*